United States Patent [19]

Hirth et al.

[11] Patent Number: 4,769,835
[45] Date of Patent: Sep. 6, 1988

[54] METHOD OF AND CIRCUIT ARRANGEMENT FOR INSERTING DIALLING INTERVALS BETWEEN STORED DIALLING DIGITS

[75] Inventors: Peter Hirth, Erlangen; Werner Frerichs, Eckental/Forth; Hubert Grucza, Nürnberg, all of Fed. Rep. of Germany

[73] Assignee: U.S. Philips Corp., New York, N.Y.

[21] Appl. No.: 830,597

[22] Filed: Feb. 18, 1986

[30] Foreign Application Priority Data

Feb. 23, 1985 [DE] Fed. Rep. of Germany ....... 3506390

[51] Int. Cl.[4] ............................................. H04M 1/27
[52] U.S. Cl. ..................................... 379/355; 379/216
[58] Field of Search ............... 379/355, 356, 359, 354, 379/140, 130, 111, 216

[56] References Cited

U.S. PATENT DOCUMENTS

| 4,039,761 | 8/1977 | Nicoud et al. | 379/354 |
| 4,119,810 | 10/1978 | Marin et al. | 379/40 |
| 4,160,124 | 7/1979 | Law | 379/357 |
| 4,201,887 | 5/1980 | Burns | 379/93 |
| 4,342,882 | 8/1982 | Gravenhorst et al. | 379/355 |
| 4,571,463 | 2/1986 | Shefter | 379/355 |

FOREIGN PATENT DOCUMENTS 2401276 7/1975 Fed. Rep. of Germany .
1446024 8/1976 United Kingdom .

Primary Examiner—Stewart J. Levy
Assistant Examiner—Lawrence G. Fess
Attorney, Agent, or Firm—Thomas A. Briody; William J. Streeter; Leroy Eason

[57] ABSTRACT

A method and apparatus for providing dialling intervals in dialling sequences indirectly dialled by a register in which such sequences are stored, such intervals being in accordance with the dialling intervals produced by a user during direct dialling of such sequences. Direct dialled subscriber numbers which include a dialling interval after at least one digit therein, such as for line access, are stored in a reference memory along with such interval. Upon an indirect dialling of such sequence from a redial or abbreviated dialling register, a microprocessor in the telephone set compares such sequence digit by digit with sequences stored in the reference memory, and if there is a match inserts in the dialled sequence the dialling interval in the matching stored sequence. By counting the number of such agreements for each stored sequence of dialling digits, the sequence having the lowest count value can be erased from the reference memory and replaced by a new dialed sequence having a dialling interval, thereby reducing the necessary storage capacity of the reference memory. A dialling interval in a stored sequence is altered in accordance with the interval inserted by a user each time such sequence is directly dialled, thereby adapting to the dialling behavior of the user.

7 Claims, 2 Drawing Sheets

METHOD OF AND CIRCUIT ARRANGEMENT FOR INSERTING DIALLING INTERVALS BETWEEN STORED DIALLING DIGITS

BACKGROUND OF THE INVENTION

1. Field of the Invention

The invention relates to a method and apparatus for inserting appropriate dialling intervals between digits of dialling sequences stored in an abbreviated dialling or redial store in a telephone set.

2. Description of the Related Art

If telephone subscriber stations are connected to a private branch exchange, after connection to the PBX line has been established an interruption of the continued dialling is often required until dialtone is received for access to the public exchange line. This dialling interval must also be provided when the dialed number is stored in a register and is to be read again upon dialling by means of such register. Modern telephone apparatus often comprises key dialling devices, by means of which long subscriber numbers are stored in a register and can be requested by depression of a particular key. Such register dialling also provides performance features such as dialling repetition or redial, abbreviated dialling, target dialling, direct dialling or name dialling.

Published West German patent application No. DE-OS 2940490 discloses an automatic interval generator for dialling devices, in which the dialling information supplied by a keyboard is stored in a store. That information includes the subscriber number and direct exchange identification digits. By means of a comparison device, when dialling information is supplied a check is made whether the digit supplied is identical to a stored direct exchange identification digit. If there is such an agreement between a supplied digit and a direct exchange identification digit, after such digit is dialled an interval criterion is supplied by the store to the digit interval generator. As a result, such an interval is inserted prior to the succeeding digits of the sequence of dialling digits. The dialling interval can be a fixed interval or can be shortened by means of an additional dialtone detection circuit upon the arrival of dialling tone.

Published West German patent application No. DE-OS 2426690 discloses an automatic subscriber dialling device, in which, when dialling information is entered, an interval for identification of dialling tone is set so that an additional coded signal can be supplied between two digits of the subscriber number. By means of the additional code signal, upon the occurrence of the latter the transmission of the stored subscriber number is stopped. The command to continue transmission of the stored subscriber number can be given by the subscriber by hand or by a dialling tone identification device connected to the subscriber line.

In the aforementioned method, dialling intervals having a define maximum length are supplied or else a dialling tone detection circuit determines the instant for continued dialling. In the case of an erroneous operation by the user or replacement of an extension station, it cannot always be avoided that erroneous dialling will occur. Furthermore, since not every user is capable of carrying out a reprogramming of the dialling interval, this may involve high cost.

Published West German patent application No. DE-PS 2401276 further discloses a circuit arrangement for storing subscriber numbers that can repeatedly be requested. In such circuit arrangement time-dependent switching means are provided which respond to entry of successive digits at an interval exceeding a given minimum interval therebetween. Such time-dependent switching means may be repeatedly triggerable monostable trigger stages or counters, whose output signals are supplied to an interval coding device. The interval coding device delivers a particular signal—that cannot be interpreted as dialling information—for lengthening the dialling intervals, which is stored in the intermediate store for subscriber numbers. By means of such a circuit arrangement, the interval length can be measured and also be varied in a simple manner, but there is additional cost for the time-dependent switching means and the high storage capacity of the intermediate store for dialling digits, in which each subscriber number is stored having digits between which there is an interval exceeding the given minimum interval.

As used herein, the term "interval" signifies a dialling interval of a length exceeding the normal interval between dialling digits and which is included in a dialling sequence following a digit therein which identifies the required line connection.

SUMMARY OF THE INVENTION

An object of the invention is to provide a method of inserting dialling intervals between stored dialling digits, in which the dialling intervals made by the user during direct dialling are automatically stored and in which, when the stored subscriber numbers are read, no dialling tone identification circuit is required for inserting such dialling intervals between the digits of such numbers.

The method according to the invention has the advantage that the microprocessor which is conventionally included in key telephone dialling apparatus (subscriber stations) and which controls in known manner indication devices, dialling devices and stores, depending upon operating functions selected at the key-board, can also be used for inserting dialling intervals between the stored dialling digits. A particular operating procedure for programming the dialling intervals, or an additional dialtone identification circuit arrangement, are not required. The microprocessor (serving as a control device) checks, during entry of dialling sequences, in which sequences and at which points therein the user inserts dialling intervals, and stores them in a reference store. Since this is repeated each time upon direct dialling, the same sequences of dialling digits need not be stored anew each time.

The method according to the invention also has the advantage that each subscriber number stored in the reference memory is weighted, thereby providing a criterion, with reference to which the decision can be made, which subscriber number already stored in the reference memory should be erased upon the storage of a new number. If, for example, the extension station is changed, subscriber numbers stored in the reference memory can be erased in a simple manner by assigning to the new subscriber numbers stored in the reference memory a higher weighting.

The method according to the invention further has the advantage that the interval length can be corrected in a simple manner. If the user employs an interval of, for example, 6 seconds upon initial entry of a new subscriber number, and employs shorter dialling intervals upon subsequent entries of such number, the stored interval length is corrected by shortening it in discrete steps.

BRIEF DESCRIPTION OF THE DRAWINGS

The invention will now be described more fully, by way of example, with reference to the accompanying drawings, in which.

DESCRIPTION OF THE PREFERRED EMBODIMENTS

Figure 1:
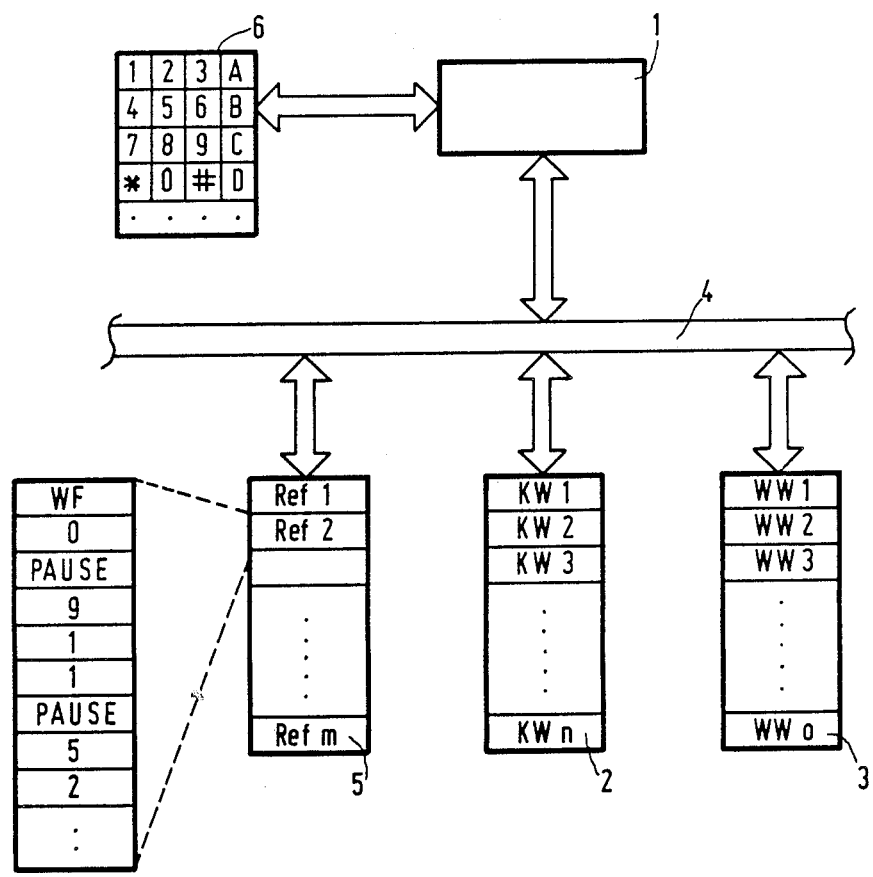
FIG. 1 shows the devices used in the method according to the invention in a subscriber station.

The subscriber station in FIG. 1 has a control device 1, an abbreviated dialling store 2, a last number dialling repetition or dedial store 3, a reference memory 5 and a data bus 4 interconnecting them.

Each time a subscriber number is entered by means of a dialling device 6 (direct user dialling), control device 1 (for example a PCD 33 43 microprocessor of the Valvo Company, W. Germany) determines whether the user inserted a dialling interval. If so, the sequence of digits of such subscriber number, inclusive of the dialling interval length, is stored in the reference memory 5 if that sequence of subscriber number digits (reference pattern) is not already present therein. If the sequence is already present, as the case may be, the dialling interval length (i.e. the interval for line identification) of the stored sequence is corrected and also the count value thereof is incremented (see the description below of FIG. 2). If subsequently a register dialling, for example by the abbreviated dialling store, is carried out, the abbreviated dialling number address is supplied by the user by means of the dialling device 6 and with reference to this address (abbreviated dialling number) the subscriber number present in the abbreviated dialling store 2 at that address is read and is supplied to the controld evice 1. The control device 1 compares the supplied subscriber number digitwise with the sequences of dialling digits stored in the reference store 5. If a dialling interval for line identification occurs after a digit in a sequence read from the reference store 5 which is the same as a digit read from the abbreviated dialling store 2, the control device 1 inserts that dialling interval at this point and proceeds with comparison of the subsequent digits of the subscriber number supplied from the abbreviated dialling store 2. In contrast with known methods, during programming of the registers (for exmaple redial store 3) the user need no longer know at what point a dialling interval must be inserted and he need not operate, for example, a particular key for inserting a dialling interval. In the reference memory 5, the dialling digits, the dialling interval and at least one weighting factor WF are stored for each subscriber number. Control device 1 is preferably a microprocessor, which serves in known manner to control indication devices, the dialling device 6 and the respective stores 2, 3 and 5 in dependence upon operating functions supplied at the key-board.

Figure 2:
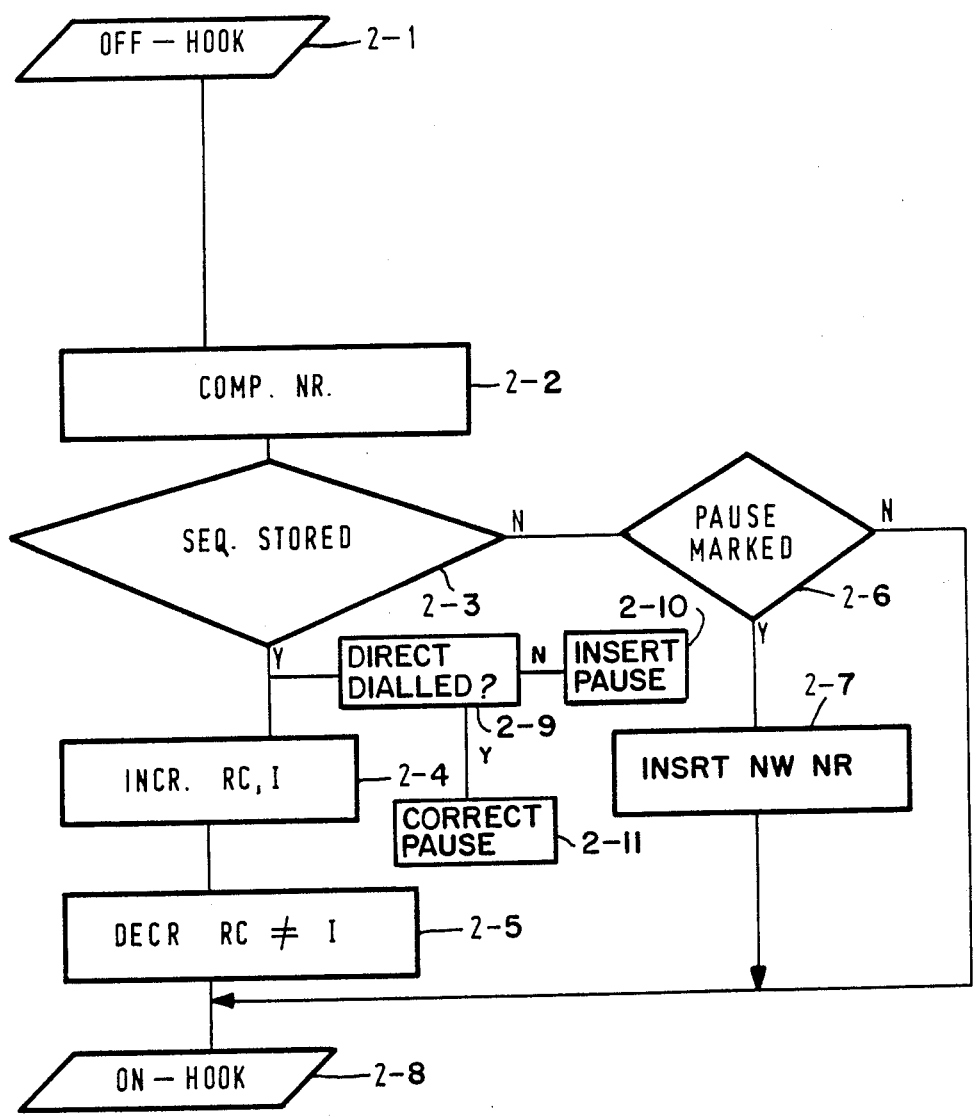
FIG. 2 is a flow diagram for interval identification in the method according to the invention.

With reference to the flow diagram of FIG. 2, the storage procedure is further described and explained hereinafter.

The several blocks in the flow chart have the following mean:

| Block No. | Caption | Meaning |
| --- | --- | --- |
| 2-1 | OFF-HOOK | the handset is lifted, the subscriber dials. |
| 2-2 | COMP NR | compare dialled number with numbers stored in reference memory, digit by digit. |
| 2-3 | SEQ STORED | determine if the dialled digit sequence is already in the reference memory. |
| 2-4 | INCR REC, I | if 2-3 is yes, increase the count value of that already stored sequence |
| 2-5 | DECR RC ≠ I | decrease the count values of all other stored sequences. |
| 2-6 | PAUSE MARKED | if 2-3 is no, determine if the dialled sequence includes a dialling interval. |
| 2-7 | INSRT NW NR | if 2-6 is yes, erase the number in the reference store having the lowest count value and insert the dialled sequence. |
| 2-8 | ON-HOOK | wait for going on-hook of the handset. |
| 2-9 | DIRECT DIALLED? | determine if the sequence was dialled by the user directly, or indirectly by the redial or abbreviated dialling store. |
| 2-10 | INSERT PAUSE | if indirectly dialled, insert in such sequence the dialling pause or pauses in the stored sequence. |
| 2-11 | CORRECT PAUSE | if directly dialled, correct the dialling pauses in the stored sequence to agree with those in the directly dialled sequence. |

2-6 PAUSE MARKED if 2-3 is no, determine if the dialled sequence includes a dialling interval.

2-7 INSERT NW NR if 2-6 is yes, erase the number in the reference store having the lowest count value and insert the dialled sequence.

2-8 ON-HOOK wait for going on-hook of the handset.

2-9 DIRECT DIALLED? determined if the sequence was dialled by the user directly, or indirectly by the redial or abbreviated dialling store.

2-10 INSERT PAUSE if indirectly dialled, insert in such sequence the dialling pause or pauses in the stored seqeunce.

2-11 CORRECT PAUSE if directly dialled, correct the dialling pauses in the stored sequence to agree with those in the directly dialled sequence.

After the user has removed the handset and has dialled a seqeunce having a dialling interval, if such sequence is not in the reference memory 5 the stored sequence therein having the lowest count value is erased and the dialled sequence is entered therein in situ. A comparison of each dialled digit with a digit present at the same relative position in each sequence stored in the reference memory 5 is effected by control device 1. If a dialled digit is already present in a stored sequence and an interval is in the reference memory at the same position, the associated count value is incremented and, as the case may be, the interval length is corrected. The count value of a stored sequence can be incremented by one or in accordance with the number of digit agreements with a dialled sequence.

If a corresponding sequence of dialling digits is not yet present in the reference memory 5 and an interval is detected in a dialled sequence, the count value of the relevant subscriber number is incremented to a given value and such subscriber number is stored in the reference memory 5. Subscriber numbers stored in the reference memory 5 which are no longer required can be erased in a simple manner in that the count value of a corresponding sequence of digits is incremented and the count values of other sequences in reference memory 5 are decremented.

Each time a subscriber number is dialled by a user, the control device 1 measures the dialling interval therein and compares it with the dialling interval of the same subscriber number stored in the reference store 5. The stored interval length can be corrected by a stepwise shortening or lengthening, and in the case of an interval smaller than a given length the subscriber number in the reference store 5 is erased.

Thus, by means of the method according to the invention, the reference memory 5 is adapted in a simple manner to the dialling behavior of a particular user.

What is claimed is:

1. In a telephone set comprising a dialling device by which a user can dial a telephone number sequence directly or indirectly by means of an abbreviated dialling or redial store comprised in such telephone set which stores dialling sequences; a method of inserting appropriate dialling intervals in dialling sequences which are indirectly dialled from such store, such method comprising:
   storing in a reference memory each dialling sequence which is directly dialled by such user and which contains at least one dialling interval therein, such dialling interval being included in such stored sequence;
   upon a subsequent indirect dialling of a dialling sequence contained in said store, making a digit-by-digit comparison of such indirectly dialled sequence with each sequence stored in said reference memory; and
   when such comparison determines that such indirectly dialled sequence matches a sequence stored in said reference memory, inserting in such indirectly dialled sequence the same dialling interval as that included in the matching sequence stored in the reference memory.

2. A method as claimed in claim 1, further characterized in that a count is kept of the number of times each sequence stored in the reference memory matches a sequence directly dialled by the user; and each time the user directly dials a sequence not stored in the reference memory and which contains a dialling interval, the sequence therein having the lowest count value is erased and replaced by such dialled sequence.

3. A method as claimed in claim 2, further characterized in that each time a directly dialled sequence matches a sequence stored in the reference memory the count value of such matching stored sequence in incremented and the count values of other sequences stored therein are decremented.

4. A method as claimed in claim 1, further characterized in that each time the user directly dials a dialling sequence containing a dialling interval and which matches a sequence stored in the reference memory, the dialling interval in such stored sequence is corrected to match the dialling interval in the directly dialled sequence.

5. A method as claimed in claim 4, further characterized in that only dialling sequences which contain a dialling interval exceeding a given minimum length are stored in the referenc memory.

6. A method as claimed in claim 5, further characterized in that correction of the dialling interval of a sequence stored in the reference memory is effected by shortening or lengthening such interval in incremental steps, and a sequence stored therein containing a dialling interval which is to be shortened to less than said given minimum length is erased from the reference memory.

7. In a telephone set comprising a dialling device by which a user can dial a telephone number sequence directly or indirectly by means of an abbreviated dialling or redial store comprised in such telephone set which stores certain of such dialling sequences, such dialling device and such store being interconnected by a data bus; a circuit arrangement for inserting appropriate dialling intervals in dialling sequences which are indirectly dialled from such store, such arrangement comprising:
   a reference memory connected to said data bus;
   a microprocessor connected by said data bus to said dialling device, to said reference memory and to said store;
   said microprocessor being adapted to store in said reference memory each dialling sequence which is directly dialled by such user on said dialling device and which contains at least one dialling interval therein, such dialling interval being included in such stored sequence; and
   said microprocessor being further adapted, upon a subsequent indirect dialling of a dialling sequence contained in said store, to determine whether such indirectly dialled number sequence matches a number sequence stored in said reference memory and upon such determination to cause said dialling device to insert in such indirectly dialled sequence the same dialling interval as that included in the matching sequence stored in said reference memory.

* * * * *